Oct. 23, 1956   E. M. BARBER   2,767,692
METHOD OF OPERATING AN INTERNAL COMBUSTION ENGINE
Filed April 29, 1953   3 Sheets-Sheet 2
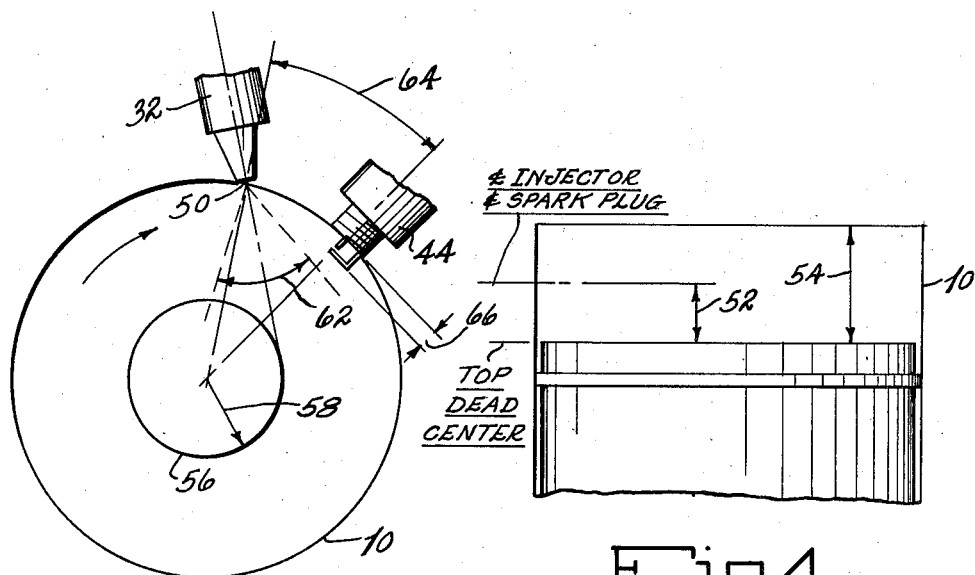
Fig. 3.
Fig. 4.
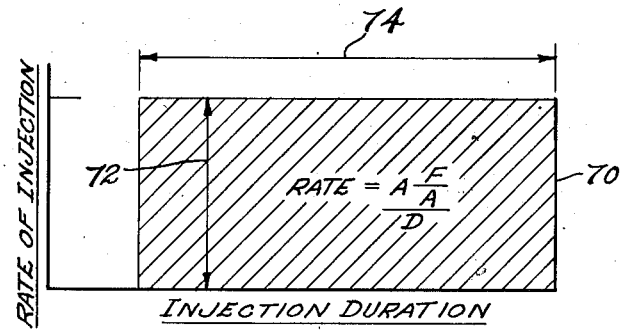
Fig. 6.
INVENTOR.
Everett M. Barber Oct. 23, 1956  E. M. BARBER  2,767,692
METHOD OF OPERATING AN INTERNAL COMBUSTION ENGINE
Filed April 29, 1953  3 Sheets-Sheet 3

INVENTOR.
Everett M. Barber

United States Patent Office 2,767,692
Patented Oct. 23, 1956

2,767,692

METHOD OF OPERATING AN INTERNAL COMBUSTION ENGINE

Everett M. Barber, Wappingers Falls, N. Y., assignor to The Texas Company, New York, N. Y., a corporation of Delaware Application April 29, 1953, Serial No. 351,968

1 Claim. (Cl. 123—32)

The present invention relates to a method of operating an internal combustion engine with knock-free, high-compression, positive-ignition combustion of the type described generally in U. S. Patent No. 2,484,009, granted to E. M. Barber on October 11, 1949, in such a way as to obtain improved performance thereof. More particularly, the present invention is concerned with an improved combustion environment for carrying out the kind of combustion disclosed generally in the said Barber patent.

This patent 2,484,009, discloses an improved combustion process for internal combustion engines which permits the use of a wide variety of fuels including those having no octane or cetane number specification. In a preferred form of this improved combustion process, air or other oxidizing gas is caused to swirl around the interior of the engine combustion chamber during the piston compression stroke at a controlled rate with respect to the engine speed. Fuel is injected under pressure into the air charge during each cycle of operation of the engine. The injected fuel is formed into a patch of combustible mixture which is confined in one direction by the oxidizing gas swirling toward the patch and containing little or no vaporized fuel so that it is incombustible. The patch is confined on the other side by gaseous products of combustion traveling away from a flame front at the edge of the patch where the mixture is burned substantially as fast as it is formed. Combustion is confined to and completed at the leading edge of the patch. Thus, during each cycle of engine operation a patch of combustible mixture is progressively formed and consumed in a localized area in the combustion chamber. As a result little or no combustible "end" gases are permitted to exist and even when existent are not exposed to the combustion chamber pressure and temperature for the time required for their spontaneous ignition to occur. Consequently "ping" or "knock" is inhibited even with fuels with low anti-knock value at high compression ratios.

It is an object of the present invention to provide an improved combustion environment for carrying out combustion of the type above described.

It is another object of the present invention to provide a combustion environment for carrying out combustion of the type above described with improved efficiency and economy.

Another object is to provide a combustion environment for carrying out combustion of the type above described with improved specific fuel consumption.

Another object is to provide a combustion environment for carrying out combustion of the type above described with improved specific air utilization.

Another object is to provide a combustion environment for carrying out combustion of the type above described over a wide range of engine operating speeds.

Another object is to provide a combustion environment for carrying out combustion of the type above described with improved reliability over a wide range of operating conditions.

Another object is to provide a method of operating an engine of the type above described to obtain improved flexibility of performance.

These and other objects and advantages of the invention will be apparent from the following description taken in connection with the accompanying drawings wherein:

Fig. 3 is a diagrammatic drawing of a combustion chamber arrangement constructed in accordance with the present invention, taken in the same plane as Fig. 2;

Fig. 4 is a diagrammatic drawing of a combustion chamber arrangement constructed in accordance with the present invention, taken in the same plane as Fig. 1;

Fig. 6 is a graph of fuel injection in accordance with the present invention, plotted in terms of injection rate and injection duration.

Briefly, the present invention resides in the discovery that improved efficiency, economy and reliability of operation with combustion of the type here considered, as well as increased flexibility and speed range of operation, can be attained by the control within certain limits of several specific factors, whose limits define an improved combustion environment.

Figure 1:
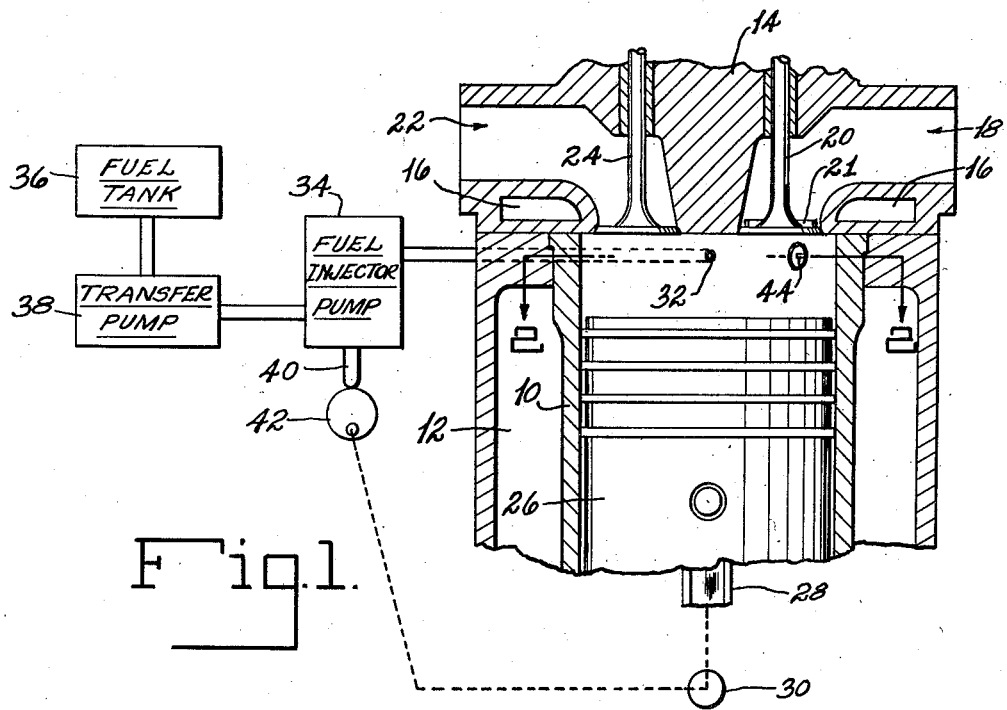
Fig. 1 illustrates one form of an engine for carrying out the improved combustion process with which this invention is concerned.
Figure 2:
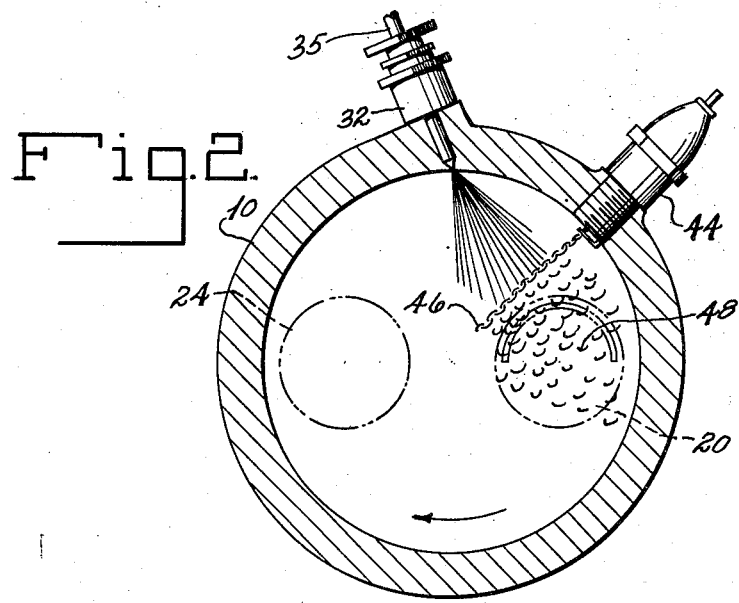
Fig. 2 is a sectional view along line 2—2 of Fig. 1.

Turning now to the drawings, Figs. 1 and 2 illustrate a four-stroke internal combustion engine arranged for operation with combustion of the type disclosed generally in the aforementioned Barber Patent 2,484,009. The engine comprises a cylinder 10 provided with a cooling jacket 12, and a head 14 provided with cooling channels 16. An air inlet port 18 opens into the cylinder through a poppet valve 20 which is provided with a semi-circular shroud 21 on one side. The shroud is placed so that it causes the inducted air to swirl rapidly around the axis of the cylinder after being drawn past the valve during the intake stroke.

An exhaust port 22 in the head opens from the cylinder through an exhaust valve 24. A conventional piston 26 reciprocates in the cylinder. The piston is provided with a conventional connecting rod 28 which is connected to an ordinary crankshaft shown diagrammatically at 30.

A fuel injection nozzle 32 is mounted in the wall of cylinder 10 above the top dead center position of piston 26, and is employed to spray fuel into the swirling air so as to impregnate a segment of the air stream with atomized fuel to form a patch of combustible fuel vapor-air mixture therein. The nozzle 32 is connected to a fuel pump 34 through a fuel injection line 35. A fuel tank 36, and a transfer pump 38 serve to provide fuel for the pump 34. The fuel pump is actuated by a stem or plunger 40, and the step is moved by a cam 42. The cam is geared to the crankshaft, and in the four-stroke engine embodiment shown it makes one complete revolution for each two revolutions of the crankshaft.

A spark plug 44 or equivalent positive ignition source is provided for igniting the combustible mixture in the cylinder. The spark plug is employed to ignite the first increment of the combustible mixture substantially as soon as it is formed, and is connected to an ignition system (not shown) which is arranged to fire the plug at the proper time to effect such ignition. Once the fuel is ignited by the electric spark from the spark plug, the flames of the burning fuel ignite the remainder of the fuel which is injected during the combustion period.

The combustion process which results from such operation is diagrammatically illustrated in Fig. 2. A flame front 46, which is shown to extend approximately radially across the cylinder, is formed during each combustion period. This flame front is located at the front of the patch of combustible mixture which is formed when the injected fuel mixes with the swirling air mass, and the flame front serves to burn the mixture substantially as fast as it is formed. The flame front tends to travel in a direction counter to the swirl of the air mass and toward the point of injection of the fuel. The combustion products 48 travel in the direction of swirl and away from the flame front. The patch of combustible mixture is thus confined on one side by an incombustible mass of the combustion products swirling away from the patch, and on the opposite side by an incombustible mass of air into which no fuel has been injected or which does not contain enough vaporized fuel to form a combustible mixture. Under these conditions, substantially no combustible "end" gases are formed and even if formed do not attain a temperature and pressure for a sufficient length of time to result in spontaneous ignition. Consequently, "ping" or "knock" is inhibited even with fuels of low anti-knock value at high compression ratios.

The present invention arises from the discovery that there are four principal factors which affect engine performance in engines employing combustion of the above-described type, and that if these factors are brought within limits hereinafter prescribed a substantially improved combustion environment results, by which is afforded improved efficiency, economy and reliability of engine operation, and an increase in flexibility and speed range of engine operation. These four factors are: (a) The geometry of the combustion chamber, (b) the weight of the air charge supplied to the combustion chamber, and the rate at which it is caused to swirl about the combustion chamber, (c) the temporal and spatial distribution of the fuel injected into the air charge within the combustion chamber, and (d) the timing of ignition.

The preferred limiting characteristics of combustion chamber geometry will now be described, with particular reference to Figs. 3 and 4 of the drawings. The combustion chamber should preferably be cylindrical. The point 50 at which fuel is injected therein should preferably be at the periphery of the cylindrical combustion chamber, and at a height 52 above piston top dead center of from one-half to one-third the mean clearance distance 54 between piston and head. The fuel injection device should be aimed to spray fuel preferably in a plane normal to the combustion chamber axis and in a direction downstream of the swirling air and tangent to a circle 56 co-axial with the combustion chamber and having a radius 58 of from 0.25 to 0.5 that of the combustion chamber. The fuel should preferably emerge from the fuel injection device in a cone-shaped spray having an apex angle 62 of 40° to 60°, measured between tangents to the spray outline at its apex.

The positive ignition source should also be located adjacent the periphery of the combustion chamber, preferably at the same height in the combustion chamber as the fuel injection point 50, and, as disclosed in Patent 2,484,009, spaced 35° to 45° of arc 64 down the air stream from the fuel injection point. The point of ignition, i. e., the gap between the electrodes of the spark plug, or equivalent ignition point if a device other than a spark plug is used, should also preferably be spaced ¼ to ¾ inch inside the combustion chamber periphery, as shown at 66.

Considering next the factor of air swirl, in accordance with the present invention the air swirl rate should be as high as is practically possible. High swirl rates are desirable because the fuel-burning time is thereby shortened, heat losses are decreased, and good thermal efficiency is achieved. At the higher swirl rates, that is between 6 and 12 revolutions of the air charge per crankshaft revolution, better indicated specific fuel consumptions can be obtained, and at any given fuel air ratio the indicated specific air utilization is improved. However the attainment of very high swirl rates generally involves some compromise in volumetric efficiency. Also, at very high swirl rates, the possibility of the high speed air movement extinguishing the spark, in the manner of an air circuit breaker, is increased. The air swirl rate therefore should preferably be at least such that the entire air charge can be impregnated with fuel in not more than 70 crankangle degrees, and above that minimum rate should preferably be such that the product of thermal efficiency and volumetric efficiency is a maximum.

Figure 5:
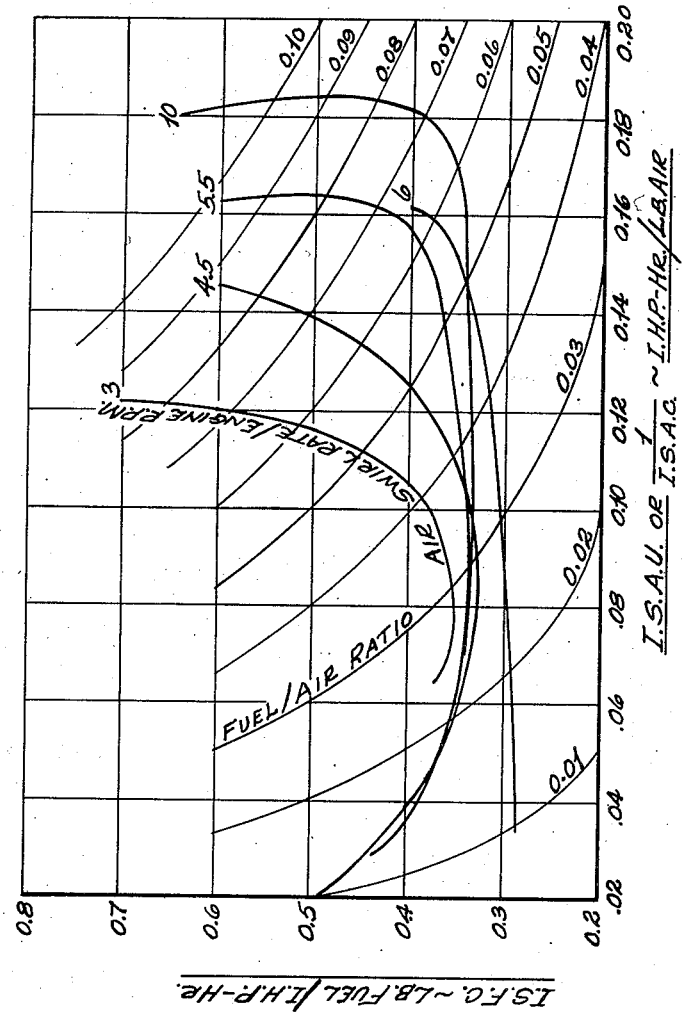
Fig. 5 is a graph showing engine performance in terms of indicated specific fuel consumption and indicated specific air utilization, at various fuel-air ratios and various air swirl rates.

The general relation between swirl rate and engine performance is shown in the graph of Fig. 5, wherein illustrative performance at a particular engine speed is plotted in terms of indicated specific fuel consumption as the ordinate and indicated specific air utilization as the abscissa, for various fuel air ratios and various air swirl rates. Since it is generally desired to achieve engine operation with as low a specific fuel consumption and as high a specific air utilization as possible, it may be seen from Fig. 5 that operation at the higher swirl rates, above 5 or 6, is most desirable. It is also apparent from Fig. 5 that a diminishing rate of return is imposed on performance as the swirl rate is further increased.

It should be recognized that the curves as shown in Fig. 5 are intended to indicate engine performance achieved with fuel injection matched to engine air consumption and air swirl rate characteristics. The factors effecting the matching of fuel injection to air consumption and rate of swirl are explained in detail hereinafter.

The effect of fuel injection on combustion environment is considered, in accordance with the present invention, as dependent upon both temporal distribution of the fuel and spatial distribution of the fuel in the combustion chamber.

Considering first the temporal distribution of fuel, it will be appreciated that the rate and duration of fuel injection, with respect to the density of the inducted air charge and rate of air swirl, control the amount of fuel in the patch of combustible mixture. If the duration of fuel injection is longer than the period required for the oxidizing air to complete one swirl, the latter part of the injected fuel will be injected into the products of combustion and wasted. If the duration of fuel injection is substantially less than the period required for the air to complete one swirl, a substantial part of the air available for burning the fuel will be wasted. Also, if the fuel is injected too rapidly, it will form a patch of combustible mixture which is too rich and which will not utilize all of the air available for burning the fuel.

In accordance with the present invention, at rated load the fuel should preferably be injected during 80 to 90 percent of the time required for the air to complete one swirl, in order to obtain efficient operation of the engine with clean combustion. By way of example, if the air completes one swirl during 60 degrees of crankangle, the duration of fuel injection should be 50 degrees of crankangle for full-load operation.

Preferably the rate of injection should be substantially constant during any one injection. This rate should preferably be equal to the total amount of fuel required to be injected to develop the rated load of the engine, divided by the injection duration for maximum power. The total fuel required at rated load will in turn be equal to the product of the total air charge and the desired over-all fuel-air ratio.

The over-all fuel-air ratio desired will, in accordance with conventional engine design practice, be dependent upon the prospective duty of the engine. Thus in automotive applications where the development of a high rated load is important, the over-all fuel-air ratio desired will generally be about .08. In heavy duty applications, such as tractors, for example, where the engine may be designed for general operation at a lower rated load, and where fuel economy may have greater importance, the overall fuel-air ratio desired will generally be closer to stoichiometric. In the latter instance, fuel load will be higher than the rated load and can be obtained by an increase in overall fuel-air ratio, developed by abnormally lengthening injection duration to a value greater than the previously mentioned 80 to 90 percent of the time required for completion of one air swirl. This of course amounts to making the engine deliberately less efficient at full load in order to achieve optimum efficiency at the lower rated load.

Fractional load operation, at any given engine speed, can be achieved in either of two ways. If the fuel injection system is sufficiently flexible to permit a variation in the fuel injection rate from one injection to the next, then part load operation can be provided by decreasing the injection rate in proportion to the load fraction while maintaining the injection duration from 80 to 90 percent of the period of one air swirl. With a fuel injection system incapable of variation in injection rate from one injection to the next at a given engine speed, the fractional engine load operation can be achieved by decreasing the duration of fuel injection in proportion to the load fraction.

Of course, since the injection duration is a function of swirl duration, and hence varies with engine speed, the preferred injection rate will vary with engine speed. This provides, at any one engine speed, a fuel injection curve 70 of substantially rectangular shape as shown in Fig. 6, wherein fuel injection rate 74 is plotted against injection duration 74 in crankangle degrees. This theoretical rectangular shape is of course impossible to achieve perfectly in practice. However for high level performance the injection system should be arranged to provide the proper injection duration to deliver the fuel quantity required for the instantaneous engine load fraction, while maintaining the injection rate as nearly constant as possible at the value above indicated.

The timing of the commencement of injection is also a factor of importance, and is dependent upon the swirl rate and the engine load fraction, injection advance as measured in crankangle degrees being generally directly proportional to both these factors. In accordance with the beginning of combustion, the burning time of the fuel charge is approximately bisected by piston top dead center. Thus for a full load injection duration of fifty crankangle degrees, and hence a total burning time of approximately fifty crankangle degrees, injection advance should be such that burning of the injected fuel has begun by twenty-five crankangle degrees before top dead center.

Considering next the spatial distribution of the injected fuel, it has been found as stated hereinbefore that the fuel should be injected preferably in the form of a conical spray having an apex angle at its source or point of origin of 40° to 60°. Also important is the degree of penetration into the combustion chamber of the fuel spray. The spray should be strong enough so that it is not deflected excessively by the swirling air, and at the same time does not penetrate so far beyond the spark plug before ignition as to form an appreciable quantity of combustible mixture well downstream of the normal flame front, since such a condition would be likely to cause spontaneous ignition and "knock."

The term spray penetration as used herein is defined as the maximum distance between the fuel injection nozzle and a standard penetrometer at which a spray issuing from the nozzle will produce an observable permanent deformation of aluminum foil covering the penetrometer grid. The penetrometer consists of a slightly convex steel plate containing a spray grid in the form of a 3¾ inch square section of waffle-like projections formed by milling grooves into the plate. This square section is covered with a piece of aluminum foil 0.0005 inch thick, which is renewed after each test.

To measure penetration, the spray is aimed horizontally and at right angles to the spray grid in the open air. From a point well beyond the visible spray, the grid is gradually moved toward the nozzle until the fuel spray causes a permanent deformation of the aluminum foil. At this point the distance from the spray grid to the nozzle in inches is measured as the spray penetration.

It has been found in accordance with the present invention that the fuel injection system should be arranged to provide a spray penetration of preferably two to three times the combustion chamber diameter, measured at an injection frequency corresponding to the engine speed of interest and at a fuel flow rate corresponding to full load injection quantity.

It is also important that the spray tip velocity, i. e., the propagation velocity of the initial portion of injected fuel, be high enough so as to travel rapidly across the combustion chamber and prevent a collection of fuel in the immediate vicinity of the injection nozzle which would cause a localized excessively rich impregnation of the air at that point. Such excessively rich mixture burns too slowly, requiring an excessive ignition advance to provide sufficient burning time for the charge before the exhaust valve is opened. It has been found that this condition can be avoided by providing a spray tip velocity of 0.6 to 1.2 inches per degree of rotation of the fuel pump cam, measured in the open air at the injection frequency corresponding to engine speed of interest and at a fuel flow rate corresponding to full load injection quantity.

The final factor to be considered as of importance to improved operation of the combustion process here involved is the timing of the positive ignition source. In general, it is necessary to provide positive ignition before an excessive amount of fuel air mixture accumulates in the combustion chamber so that detonation will not occur, and yet the positive ignition must not occur so early that the incendiary power of the ignition source is gone before the first elements of combustible mixture formed by the injected fuel reach the ignition locus. Ignition timing is therefore dependent upon the timing of the beginning of fuel injection. With the temporal and spatial fuel distribution characteristics arranged within the limits above specified, it has been found that, to provide knock-free combustion, the spark or equivalent positive ignition source should be timed so that part of the duration of its incendiary power occurs within the period from three to ten degrees of crankangle movement following the start of fuel injection. As hereinbefore stated, maximum thermal efficiency is achieved by timing the beginning of fuel injection so that the beginning of burning, that is the degrees of crankangle prior to top dead center at which an appreciable combustion has been initiated, should be one-half the crankangle duration of one air swirl for full load operation, while at part or fractional loads the beginning of burning should precede top dead center by an amount which varies in direct proportion with the load fraction.

Since the energizing of the ignition source should precede the beginning of burning by the ignition lag, that is the time required for appreciable combustion to be initiated after the provision of incendiary power at the ignition source, and since the preferred time delay between the beginning of fuel injection and existence of incendiary power at the ignition source is three to ten crankangle degrees as above set forth, the sum of these two factors determines the preferred time for the beginning of fuel injection. With engine operation in the manner hereinbefore described, the sum of these two factors has been found to be about 5 to 20 crankangle degrees. Fuel injection should therefore commence at a point before top dead center equal to 5 to 20 degrees plus the product of one-half the swirl duration and the load fraction. And the ignition source should be timed so that part of its incendiary power exists during the period from three to ten degrees after beginning of fuel injection.

Thus, there has been shown and described the several factors, and the various limits within which it has been discovered each must be adjusted, to provide an improved combustion environment for achieving improved operation of an internal combustion engine utilizing the combustion process described generally in U. S. Patent No. 2,484,009.

Obviously many modifications and variations of the invention, as hereinbefore set forth, may be made without departing from the spirit and scope thereof, and therefore only such limitations should be imposed as are indicated in the appended claim.

I claim:

In the method of operating a reciprocating piston, internal combustion engine which comprises forming a mass of compressed swirling air rotating at high velocity within a disc-shaped combustion chamber of a cylinder of said engine, injecting fuel into said mass of compressed swirling air so as to impregnate with fuel substantially uniformly a localized segment of said mass of swirling air as it rotates past the locus of fuel injection, promptly igniting the first increment of injected fuel at a point near said locus of fuel injection and substantially as soon as combustible fuel-air mixture has formed therefrom to establish a flame front traveling in the direction opposite that of said mass of swirling air, the resulting incombustible combustion products rotating away from said flame front as fresh compressed air rotates toward said flame front, whereby the traveling flame front is confined on its downstream side by a layer of said incombustible products and on its upstream side by a layer of incombustible air, continuing the injection of fuel into a localized portion of said fresh compressed air immediately in advance of said traveling flame front to form progressively additional combustible fuel-air mixture to be ignited immediately by said traveling flame front and burned substantially as rapidly as formed, while maintaining said flame front confined between incombustible layers, the improvement comprising injecting fuel in the form of a spray into said combustion chamber from a point on its periphery having a height above piston top dead center position from $\frac{1}{2}$ to $\frac{1}{3}$ the clearance distance between piston and head, said spray being aimed in a direction tangent to a circle coaxial with said cylinder and with a radius from 25 to 50 percent that of said cylinder and having a conical shape with an apex angle at its source of 40°–60°, the fuel injection commencing before piston top dead center position at an amount equal to one-half the injection duration plus 5 to 20 crankangle degrees and continuing at a substantially constant rate for a maximum period for rated load which is less than 0.9 of one swirl duration as the load varies and being coordinated with the air swirl rate and density to impregnate said localized segment of swirling air at a controlled fuel-air weight ratio of between .04 to .08, said fuel being injected into said combustion chamber with a spray tip propagation velocity as measured in open air of 0.6 to 1.2 inches per crankangle degree with a penetration of 2 to 3 times the cylinder bore, producing a source of positive ignition at the same height as said point of fuel injection and spaced 30°–45° of arc downstream therefrom in the direction of air movement and at a radius of $\frac{1}{4}$ to $\frac{3}{4}$ inch less than the cylinder radius, and timing said ignition from 3 to 10 crankangle degrees after the beginning of fuel injection.

References Cited in the file of this patent

UNITED STATES PATENTS 2,484,009     Barber  ---------------- Oct. 11, 1949